United States Patent [19]

Gallagher et al.

[11] 4,070,580
[45] Jan. 24, 1978

[54] METHOD AND APPARATUS FOR FIELD IONIZATION FOR ISOTOPE SEPARATION

[75] Inventors: Thomas F. Gallagher; Robert M. Hill; Stephen A. Edelstein, all of Palo Alto, Calif.

[73] Assignee: Stanford Research Institute, Menlo Park, Calif.

[21] Appl. No.: 658,386

[22] Filed: Feb. 17, 1976

[51] Int. Cl.² .................. H01J 37/08; B01D 59/44
[52] U.S. Cl. .................. 250/423 P; 250/284; 250/424
[58] Field of Search .......... 250/423 R, 423 P, 424, 250/423 F, 281, 282, 283, 284; 204/157.1 R

[56] References Cited

U.S. PATENT DOCUMENTS 3,740,552   6/1973   Pressman .................. 250/423 P

OTHER PUBLICATIONS

"Stark Ionization of High Lying States of Sodium," Ducas et al., Physical Review Letters, vol. 35, No. 6, Aug. 11, 1975, pp. 366-369.

Primary Examiner—Craig E. Church
Attorney, Agent, or Firm—Victor R. Beckmann

[57] ABSTRACT

Isotope separation method and means are shown wherein an atomic beam containing two or more isotopes is exposed to radiation at a predetermined first wavelength to excite atoms of only one said isotope to a first intermediate excited state without substantially exciting atoms of other isotopes. These excited atoms are excited by a second radiation source at a second predetermined wavelength to a state of high principal quantum number, a Rydberg state, beneath the ionization continuum, again substantially without exciting atoms of said other isotopes to such high energy levels since substantially none of the other isotopes are in the intermediate excited state. From this bound atomic level only slightly below the ionization limit, the highly excited atoms are field ionized by electron tunneling and thence removed from the nonionized atoms by use of a moderate electric field.

20 Claims, 4 Drawing Figures

METHOD AND APPARATUS FOR FIELD IONIZATION FOR ISOTOPE SEPARATION

BACKGROUND OF INVENTION

The advent of tunable visible and infrared lasers makes possible laser isotope separation, the use of which has long been attractive because of the ease with which isotopes can be spectroscopically resolved. This is in marked contrast to the conventional techniques such as gaseous diffusion and the gas centrifuge which use the small mass differences of isotopes. For heavy atoms this difference is quite small. For example, $U^{235}$ and $U^{238}$ differ in mass by less than 2%. Consequently these more conventional techniques can achieve only marginal enrichment of the desired isotope per step. Thus, to obtain useable isotopic enrichment (e.g. 3% of $U^{235}$ in $U^{238}$), the process must be repeated many times. The practical implication of this is that many stages of enrichment must be cascaded, resulting in a large scale physical installation.

Additionally, different schemes of laser isotope separation are known, which may be grouped into four catagories, as follows:

1. Selective excitation of vibrational or electronic states which subsequently chemically react to produce chemical species which can then be separated.
2. Selective excitation to molecular states, which then dissociate, followed by chemical reaction with the dissociated species, and subsequent chemical separation.
3. Photon reactions with beams of atoms or molecules to give directions of the isotopic species by photon pressure.
4. Multiphoton excitation leading to excitation of autoionizing states or photoionization of the excited species and removal by electric fields.

Of the above process, the present invention relates most closely to process 4. It differs from prior art process in the use of two-photon excitation into a bound atomic level close to the ionization limit of the atom (Rydberg level) and subsequent field ionization and removal by a moderate electric field. The method and means of this invention offer significant advantages over current methods, including process 4 above.

SUMMARY OF INVENTION

An object of this invention is the provision of method and apparatus for isotope separation which are efficient and require a minimum of energy for operation.

An object of this invention is the provision of method and apparatus for laser isotope separation which are readily adaptable for use either with a small-scale or a large-scale separation facility.

An object of this invention is the provision of laser isotope separation method and means which, in a C.W. operating configuration, provide for substantially 100% separation in one operation eliminating the need for cascading many separation stages.

An object of this invention is the provision of method and apparatus of the above mentioned type which are readily adapted for use in enriching both raw material and partially spent fuel from a $U^{235}$ reactor.

The above and other objects and advantages of this invention are achieved by exposing an atomic beam of material containing at least first and second isotopes to radiation of a first predetermined wavelength to optically pump atoms of the desired isotope to an intermediate excited state without exciting atoms of the other isotopes. The excited atoms are pumped by radiation of a second predetermined wavelength to a Rydberg state of high principal quantum number (e.g. $n=16$). The beam containing the atoms excited to the Rydberg state by such first and second resonant excitation means is exposed to a modest electric field for field ionization of such excited atoms, and the ions of the desired atoms are extracted from the beam by use of said electric field.

Figure 1:
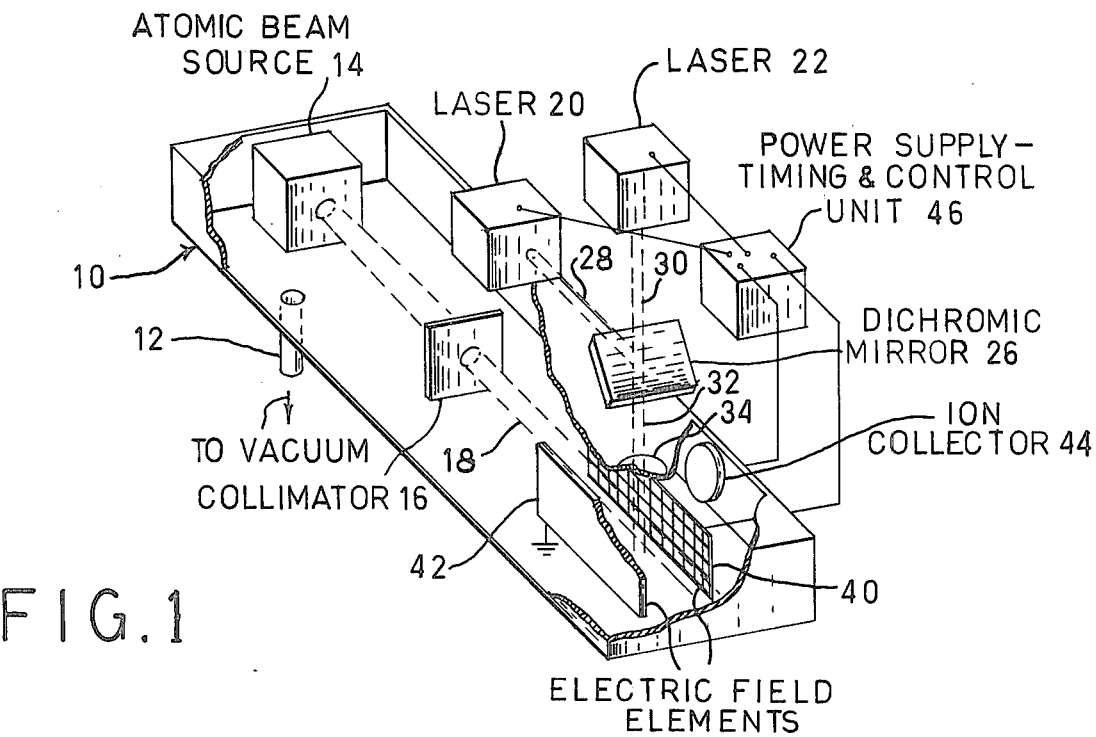
FIG. 1 is a simplified perspective view, in diagrammatic form, of apparatus for isotope separation embodying this invention.

Reference first is made to FIG. 1 wherein apparatus embodying this invention is shown comprising a housing, or cell, 10 within which isotope separation is effected. The housing is evacuated to a low pressure of say $10^{-6}$ torr as by use of a vacuum pump, not shown, connected thereto through an outlet 12. An atomic beam source 14, comprising an oven, is provided adjacent one end of the housing for the vaporization of material containing at least first and second isotopes, one of which isotope is to be separated from the remainder thereof. The vaporized material is passed through an apertured wall or collimating means 16 for production of an atomic beam 18. For isotopic separation of $U^{235}$ atoms from $U^{238}$ atoms, for example, a beam consisting essentially of such atoms is provided by oven 14 and collimator 16. For purposes of description only and not by way of limitation, an atomic beam on the order of say 0.3 cm to 1 cm in diameter may be employed.

First and second lasers 20 and 22 are provided for illumination of a common beam volume. The beams from lasers 20 and 22 pass through suitable lenses, or lens systems, not shown, to provide collimated illuminating beams of sufficient diameter for illumination of an entire cross-sectional area of the atomic beam. A dichromic mirror 26 is shown for directing the laser beams 28 and 30 along a path 32 which intersects the atomic beam 18 perpendicular thereto. Obviously, illumination by lasers located at different radial positions about the atomic beam is possible thereby eliminating the need for the dichromic mirror 26.

In the illustrated arrangement the laser beams enter the enclosure through a window 34 in the top of the enclosure.

Illumination of the atomic beam from the one laser 20 optically pumps atoms of the one isotope to an intermediate excited state without excitation of atoms of the other isotope or isotopes. Such selective excitation is provided by proper selection of the operating wavelength and bandwidth of laser 20. This first resonant excitation of selected atoms is followed by a second resonant excitation of the excited atoms by operation of the illuminating beam 30 from the laser 22. The wavelength of the second radiation source 22 is selected to pump the excited atoms to a Rydberg state of high principal quantum number. None of the atoms of either isotope ionize, or autoionize, by means of the resonant pumping operation of the lasers. Instead, atoms in the high excited state are field ionized by operation of an electric field applied thereto by electric field producing elements 40 and 42. Element 40 may comprise a grid or "transparent" plate through which ions may pass for collection by an ion collector 44. The other electrode 42 simply may comprise a solid plate. The strength of the electric field is sufficient to ionize only those atoms which are excited to the high energy level state, and the direction of the field is such that the ions are accelerated out of the atomic beam, toward the ion collector. In this case the plate 40 is supplied with a negative potential relative to the plate 42 for such acceleration, and the ion collector 44 is maintained at a negative potential relative to the plate 42 for ion collection.

In some situations using continuous operating lasers the cross section for absorption of the second photon will be low due, for example, to line broadening by the electric field. In such situations an intracavity laser may be used to saturate the transition. This would entail putting one of the laser cavity mirrors on the opposite side of the atomic beam from the amplifier medium so that the atomic beam was actually in the laser cavity as defined by the two end mirrors of the laser. Such intracavity configurations are well known and require no additional description.

Figure 2:
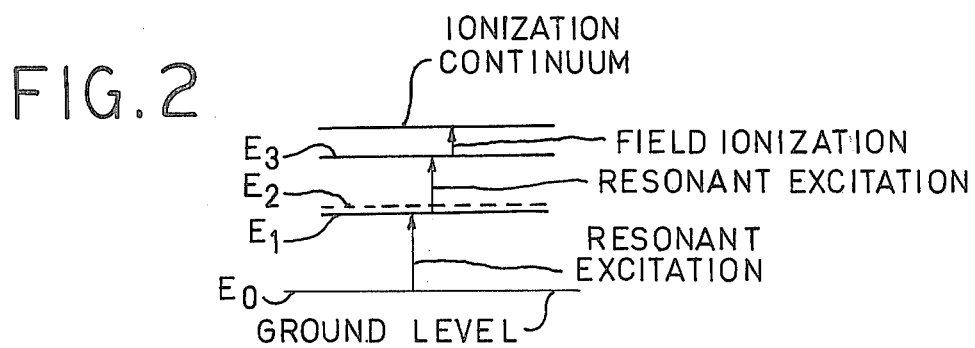
FIG. 2 is an energy level diagram for an isotope of uranium, by which diagram steps involved in the isotopic separation process of this invention are illustrated.

Reference now is made to FIG. 2 wherein there is shown an energy level diagram for an isotope, such as $U^{235}$, which is to be separated from $U^{238}$. $E_0$ identifies the ground level energy, and represents the energy of the $U^{235}$ in its lowermost state. The ground level energy for $U^{238}$ is substantially the same, i.e. $E_0$. The $U^{235}$ is pumped, through resonant excitation, to energy level $E_1$ by operation of the laser 20. It will be noted that an adjacent energy level $E_2$ exists for $U^{238}$ from which the $U^{235}$ is to be separated. However, $U^{238}$ atoms are not excited to such level by operation of the laser 20 since the laser is tuned for selective excitation of $U^{235}$ atoms to energy level $E_1$ without excitation of $U^{238}$. A second resonant excitation of the excited $U^{235}$, this time by illumination from the laser 22, pumps the excited atoms from the intermediate energy level $E_1$ to a second bound atomic energy level $E_3$ adjacent the ionization continuum. With the present arrangement, operation of the lasers 20 and 22 at different wavelengths, both within the visible spectrum is contemplated when used in the separation of the isotope $U^{235}$ from $U^{238}$. From the high energy state (at a Rydberg level) the atoms are ionized by use of a moderate electric field (say, $10^4$ volts/cm) supplied by the spaced electrodes 40 and 42 connected to the DC power source and timing and control unit 46. (See FIG. 1) As will become apparent from the potential diagram of FIG. 3, described below, ionization is effected by tunneling of loosely bound electrons of the highly excited atoms through the field barrier. Ions produced this way are accelerated out of the atomic beam and collected.

Figure 3:
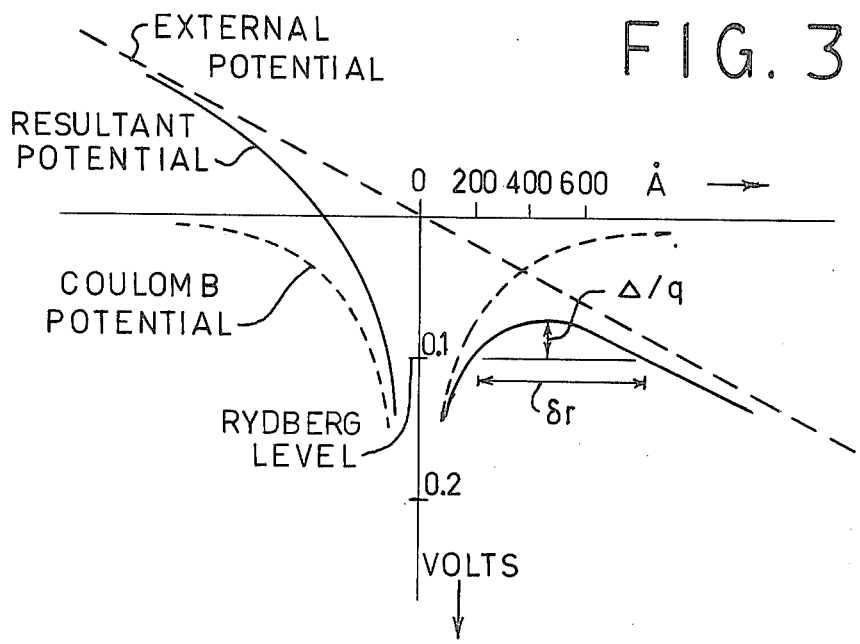
FIG. 3 is a potential diagram for an atom of the isotope in an electric field.

Reference now is made to FIG. 3 wherein a potential diagram for a highly excited atom at a Rydberg level is shown. The coulomb potential of the atom is shown by the short-segment broken lines, the external potential supplied by the electric field is represented by the long-segment broken lines, and the resultant potential is shown in full lines, as labelled. As noted above, it will be seen from FIG. 3 that in accordance with the present invention field ionization is effected by tunneling of electrons through the field barrier which, in the illustrated diagram has a height $\Delta/q$ and a width $\delta r$. The field ionization rate for an electron in the atomic state shown in FIG. 3 is given by the probability for tunneling through the field barrier multiplied by the orbital electron frequency or the number of times per second it approaches the barrier. The field barrier, and hence the probability for tunneling therethrough is adjustable by simple adjustment of the electric field potential employed. Control over the breadth of the absorption line is possible by such control of the field ionization rate. Consequently, the line width (being equal to the field ionization rate) may be adjusted to match the bandwidth of laser 22.

Different operating modes ranging from pulse to continuous, and combinations of pulse and continuous operation, are contemplated. For purposes of illustration only and not by way of limitation, various operating modes are shown in the timing diagram of FIG. 4, to which reference now is made. A simple mode of operation is illustrated by Mode 1 of FIG. 4 wherein pulse operation of both of the lasers 20 and 22, and pulse operation of the electric field is shown. In the illustrated operating cycle the one laser 20 first is pulse operated with a pulse duration on the order of say 5ns to pump atoms of the selected isotope to an intermediate energy level. Either substantially simultaneously therewith, or a short time later, say 5ns later, the second laser 22 is pulse operated to pump the excited atoms of the selected isotope to the high energy, Rydberg, level. Again, a pulse on the order of say 5ns may be provided. As noted, the time delay between the first and second laser pulses may be from 0 to, say, 5ns. Later (say 0.5 μs after the second laser pulse) the electric field is switched on for field ionization of the high energy level atoms and acceleration of the ions from the atomic beam under control of the electric field and ion collector. The ion collector, which is outside the ionizing electrodes, may remain energized without affecting the laser pumping and field ionization functions. In the Rydberg state the large orbit of the electrons has a poor overlap with the radial wave functions of the lower states, giving rise to a very long radiative lifetime. Consequently, the electric field may be switched on after a relatively long period on the order of say 10 μs and still be effective in the ionizing and separating functions. After a rest period of say 100 μs for return to a quiescent condition, the cycle is repeated. In addition to the long radiative lifetime of atoms in the Rydberg state, such atoms have cross sections which are many orders of magnitude larger ($10^3$ to $10^4$ times larger) than the cross sections for direct photoionization from the intermediate state. The large increase in effective absorption cross section greatly reduces the amount of power required to efficiently separate the isotopes as compared, for example, to the above mentioned prior art arrangements wherein photoionization, or photoexcitation leading to autoionization, from an intermediate energy level is provided.

Figure 4:
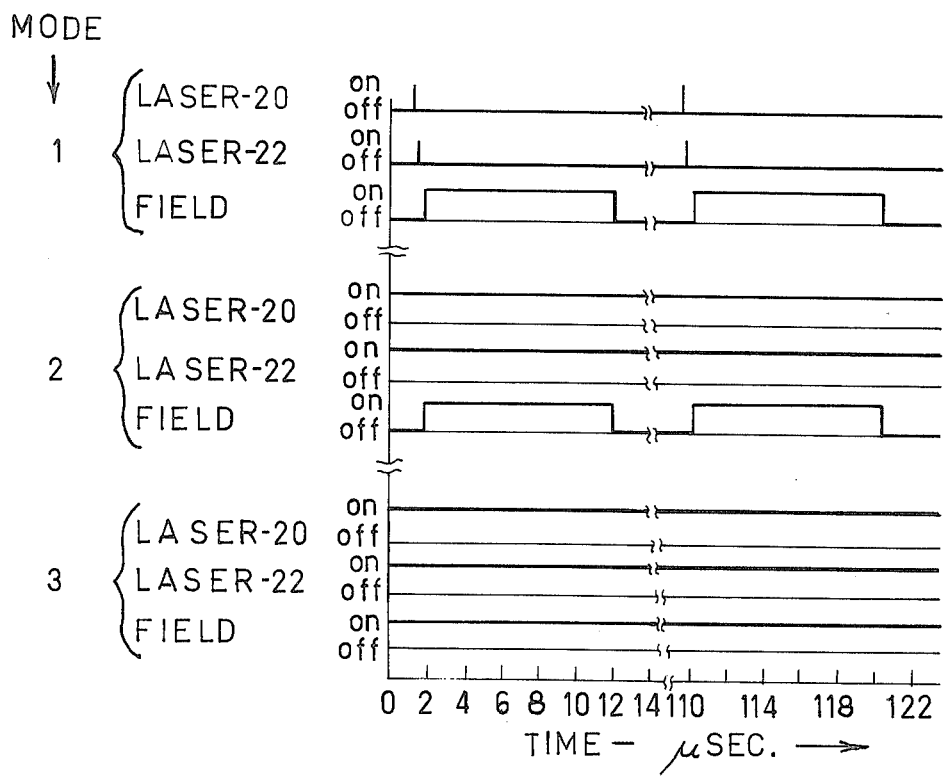
FIG. 4 is a timing diagram illustrating several different operating modes for the apparatus shown in FIG. 1.

In the second operating Mode illustrated in FIG. 4 both lasers operate continuously and only the electric field is periodically switched on and off. With this arrangement the lasers 20 and 22 are tuned for resonant excitation of the selected atoms to the desired bound levels in the absence of the electric field since, as described below, different tuning is required with the presence of an electric field.

At Mode 3 of FIG. 4 continuous operation of both of the lasers and of the electric field is shown. As noted above with reference to the Mode 2 operation, the presence of an electric field (say on the order of 10Kv/cm) affects both the cross sections and wavelengths involved in the separation process. The transition from ground level to the intermediate energy level provided by laser 20 is virtually unaffected by the electric field. However, the high energy state has substantial Stark splittings in the presence of the electric field leading to a shift and broadening of the intermediate to high energy level transition. Because of such broadening the second laser 22 must operate over a band of frequencies, on the order of 40A, to pump all of the sublevels of the high energy state. Also, the presence of the electric field during such resonant pumping alters the intermediate to high level optical absorption cross section, decreasing the same. Nevertheless, the cross sections remain larger (approximately three orders of magnitude greater) than the photoionization cross sections of the above-mentioned prior art photoionization processes.

The cross sections for the second photon absorption are well known in zero or low level electric fields, and are higher than they would be in a field high enough to field ionize the atoms. The atoms essentially could be pumped to the Rydberg level for long times (e.g. $\sim 10$ $\mu$) and then ionized in batches for, say, $\sim 1\mu sec$, in another operating mode embodying this invention.

The invention having been described in detail in accordance with the requirements of the Patent Statutes, various other changes and modifications will suggest themselves to those skilled in the art. For example, the use of three photons of longer wavelength, instead of two, would be obvious. It is intended that the above and other such changes and modifications shall fall within the spirit and scope of the invention as defined in the appended claims.

We claim:

1. A method of separating isotopes of a material containing a first isotope and at least a second isotope comprising the following steps:
   a. producing from said material an atomic beam of atoms of said isotopes,
   b. exposing said beam of atoms to radiation at a predetermined wavelength for resonant excitation of atoms of said first isotope to a first intermediate energy state without substantially exciting atoms of said second isotope,
   c. exposing said beam of atoms to radiation at a predetermined wavelength for resonant excitation of atoms excited to said intermediate energy level to a second, higher, energy level,
   d. exposing said beam of atoms of an electric field for field ionization of atoms excited to said higher energy state without ionizing atoms of said second isotope, and
   e. separating the ions resulting from field ionization from the non-ionized atoms.

2. The method of separating isotopes as defined in claim 1 wherein radiation employed in step (b) and the radiation employed in step (c) are of different wavelength.

3. The method of separating isotopes as defined in claim 2 wherein the different wavelength radiations both are within the operating range of lasers.

4. The method of separating isotopes as defined in claim 1 wherein,
   the first-mentioned predetermined wavelength corresponds to a transition between the ground state and an intermediate excited state of the excited atoms of said first isotope,
   the second-mentioned predetermined wavelength corresponds to a transition between said intermediate excited state and a level adjacent and below the autoionization energy level, and
   the electric field is of a strength to ionize high energy level atoms by electron tunneling through a potential barrier without ionization of other atoms.

5. The method of separating isotopes as defined in claim 1 wherein the high energy level to which atoms are energized comprises a Rydberg level.

6. The method of separating isotopes as defined in claim 1 wherein said beam of atoms is exposed to first and second pulses of different wavelength radiation for resonant excitation to said first intermediate energy state and to said second energy level, respectively, and wherein said field ionization of atoms is by an electric field which is turned on following resonant excitation to said second energy level.

7. The method of separating isotopes as defined in claim 1 wherein the beam of atoms is continuously exposed to first and second different wavelength radiation for resonant excitation to said first intermediate energy state and to said second energy level respectively.

8. The method of separating isotopes as defined in claim 7 wherein atoms excited to said higher energy state are periodically exposed to said electric field for pulse field ionization thereof.

9. The method of separating isotopes as defined in claim 7 wherein atoms excited to said higher energy state are continuously exposed to said electric field for continuous field ionization thereof.

10. A method of separating first and second atomic isotopes comprising,
    subjecting said atoms to radiation of predetermined frequency for selective resonant excitation of the first isotope without excitation of the second isotope,
    subjecting said atoms to radiation of predetermined frequency for resonant excitation of the excited atoms of the first isotope to a Rydberg level without excitation of the non-excited atoms of the second isotope, and
    field ionizing Rydberg level atoms of the first isotope and separating said ionized atoms from nonionized atoms.

11. The method of separating first and second atomic isotopes as defined in claim 10 wherein field ionization is effected by application of an electric field to the isotopes for electron tunneling through the potential barrier between the Rydberg level and ionization continuum.

12. The method of separating first and second atomic isotopes as defined in claim 11 including adjusting the electric field strength for control of the breadth of the absorption line to match the bandwidth of said second laser.

13. The method of separating first and second atomic isotopes as defined in claim 10 which includes employing first and second lasers operating at different wavelengths for subjecting the atoms to radiation.

14. Apparatus for separating isotopes of a material containing a first and at least a second isotope comprising,
    means for providing an atomic beam of atoms of said isotopes,
    a first laser for exposing said beam of atoms to radiation at a first predetermined wavelength for resonant excitation of atoms of said first isotope to a first intermediate energy level but which radiation does not excite atoms of said second isotope.

a second laser for exposing said beam of atoms to radiation at a second predetermined wavelength for resonant excitation of atoms excited by said first radiation to a Rydberg energy level, and means for exposing said beam of atoms to an electric field for field ionization of atoms excited to said Rydberg level.

15. The apparatus for separating isotopes as defined in claim 14 including means including said electric field for accelerating ions from the atomic beam.

16. The apparatus for separating isotopes as defined in claim 14 wherein the electric field is of a value such that field ionization is effected by electron tunneling of the potential barrier between the Rydberg energy level and the ionization state.

17. The apparatus for separating isotopes as defined in claim 14 including means for periodically exposing said beam to said electric field.

18. The apparatus for separating isotopes as defined in claim 17 wherein said first and second lasers are continuously operated.

19. The apparatus for separating isotopes as defined in claim 17 wherein said first and second lasers are pulse operated prior to exposing said beam to said electric field.

20. The apparatus for separating isotopes as defined in claim 14 including means for adjusting the electric field strength for control of the breadth of the absorption line.

* * * * *